United States Patent
Tischer et al.

[11] Patent Number: 6,164,182
[45] Date of Patent: Dec. 26, 2000

[54] ACTUATING DEVICE FOR AUTOMATION OF A MANUAL TRANSMISSION OF VEHICLES, ESPECIALLY MOTOR VEHICLES

[75] Inventors: Dieter Tischer, Wendlingen; Roland Meyer, Roth, both of Germany

[73] Assignee: Hydraulik-Ring Antriebs-und Steuerungstechnik GmbH, Germany

[21] Appl. No.: 09/012,782

[22] Filed: Jan. 23, 1998

[30] Foreign Application Priority Data

Jan. 25, 1997 [DE] Germany ............... 197 02 656

[51] Int. Cl.[7] ........................... F01B 7/00
[52] U.S. Cl. ........................... 91/172; 92/62
[58] Field of Search ............... 91/172; 92/13.1, 92/13.4, 13.51, 13.6, 62, 68

[56] References Cited

U.S. PATENT DOCUMENTS

| | | | |
|---|---|---|---|
| 4,002,105 | 1/1977 | Bell et al. ........................... | 92/62 |
| 4,445,393 | 5/1984 | Braum ........................... | 91/172 |
| 4,559,895 | 12/1985 | Kijima et al. ........................... | 92/62 |
| 4,784,007 | 11/1988 | Ishida et al. ........................... | 74/335 |
| 4,970,942 | 11/1990 | Sibeud et al. ........................... | 91/519 |

*Primary Examiner*—F. Daniel Lopez
*Attorney, Agent, or Firm*—Robery W. Becker & Associates

[57] ABSTRACT

An actuating device for automation of a manual transmission of a vehicle has a housing in which a first main piston and a second main piston are slidably supported. A control lever, fixedly connected to the actuator shaft of the manual transmission, is provided to select a gate of the manual transmission. The control lever is positioned between the first and second main pistons. A first valve hydraulically controls and actuates the first main piston by a hydraulic medium. A second valve hydraulically controls and actuates the second main piston by the hydraulic medium.

9 Claims, 5 Drawing Sheets

FIG-1

FIG-5

ACTUATING DEVICE FOR AUTOMATION OF A MANUAL TRANSMISSION OF VEHICLES, ESPECIALLY MOTOR VEHICLES

BACKGROUND OF THE INVENTION

The present invention relates to an actuating device for automation of manual transmissions of vehicles, especially motor vehicles, comprising a housing in which two main pistons are slidably supported with which a control lever fixedly connected to the gear switching shaft (actuator shaft) of the manual transmission is displaceable for selecting a gate. The pistons are controlled by valves for loading with hydraulic medium.

It is known to provide automation of manual transmissions or gear boxes of motor vehicles with actuating devices. The driver of such a motor vehicle moves the gearshift lever in order to select the respective speed. The actuating device ensures that the selection of the gate as well as of the gear is performed automatically.

For this purpose main pistons are provided which are displaced by hydraulic medium and actuate the control lever which is connected or coupled to the gear switching shaft of the manual gear box. Known actuating devices have a large number of valves with which the main pistons can be moved into the different positions. The respective control and actuating devices are thus constructively complicated.

It is an object of the present invention to embody an actuating device of the aforementioned kind such that it is comprised of only a few components but can be reliably used for automation of the manual gear box.

SUMMARY OF THE INVENTION

The actuating device for automation of a manual transmission of a vehicle according to the present invention is primarily characterized by:

A housing;

A first main piston and a second main piston slidably supported in the housing;

A control lever, fixedly connected to the actuator shaft of the manual transmission, for selecting a gate of the manual transmission;

The control lever positioned between the first and second main pistons;

A first valve hydraulically controlling and actuating the first main piston by a hydraulic medium;

A second valve hydraulically controlling and actuating the second main piston by the hydraulic medium.

Preferably, the actuating device further includes a first auxiliary piston cooperating with the first main piston and having and end face loaded by the hydraulic medium, and a second auxiliary piston cooperating with the second main piston and having an end face loaded by the hydraulic medium. The first main piston has a first end face loaded by the hydraulic medium and the second main piston has a first end face loaded by the hydraulic medium. The surface area of each one of the end faces of the first auxiliary piston is smaller than the surface area of the first end face of the first main piston. A surface area of each one of the end faces of the second auxiliary piston is smaller than a surface area of the first end face of the second main piston.

The housing preferably has a chamber under atmospheric pressure. The first main piston has a second end face remote from the first end face. The second main piston has a second end face remote from the first end face. The second end faces of the first and second main pistons are positioned in the chamber under atmospheric pressure and are facing one another.

The housing has a first and a second pressure chambers. The end face of the first auxiliary piston facing away from the first main piston is positioned in the first pressure chamber. The end face of the second auxiliary piston facing away from the second main piston is positioned in the second pressure chamber.

Advantageously, the first pressure chamber communicates with a first valve and the second pressure chamber communicates with a second valve.

Preferably, the first pressure chamber has a side wall facing the first main piston. The second pressure chamber has a side wall facing the second main piston. The first auxiliary piston has a first abutment, and the second auxiliary piston has a second abutment. The first abutment rests under hydraulic pressure at the side wall of the first pressure chamber in at least one position of the control lever. The second abutment rests under hydraulic pressure at the side wall of the second pressure chamber in a least one position of the control lever.

The end faces of the first auxiliary piston have identical surface areas and the end faces of the second auxiliary piston have identical surface areas.

The surface area of each one of the end faces of the first and second main pistons is greater than the surface area of the adjacent one of the end faces of the first and second auxiliary pistons.

The second end faces of the first and second main pistons have a surface area that is smaller than a surface area of the first end faces of the first and second main pistons.

The housing has a third and a fourth pressure chamber. The first end face of the first main piston is positioned in the third pressure chamber. The first end face of the second main piston is positioned in the fourth pressure chamber. The first valve communicates with the third pressure chamber, and the second valve communicates with the fourth pressure chamber.

Advantageously, the actuating device further comprises a first bushing slidably supported in the housing and a second bushing slidably supported in the housing. The first main piston is supported in the first bushing, and the second main piston is supported in the second bushing.

The first and second bushings have at least one position in which the first and second bushings are supported at the housing against the hydraulic pressure.

The first bushing has an end face facing away from the second bushing, and the second bushing has an end face facing away from the first bushing. The end face of the first bushing and the end face of the second bushing are loaded by the hydraulic medium.

Advantageously, the first bushing has an end face facing the second bushing, and the second bushing has an end face facing the first bushing, wherein these end faces of the first bushing and the second bushing are loaded by atmospheric pressure.

In the inventive actuating device the two main pistons are actuated by only one valve, respectively, so that in total only two valves are provided for controlling the main pistons. Thus, the inventive actuating device has a very simple construction. The control lever's reliably secured in different positions between the two main pistons.

BRIEF DESCRIPTION OF THE DRAWINGS

The object and advantages of the present invention will appear more clearly from the following specifications in conjunction with accompanying drawings, in which.

DESCRIPTION OF PREFERRED EMBODIMENTS

The present invention will now be described in detail with the aid of several specific embodiments utilizing FIGS. 1 through 5.

The inventive actuating device provides for automation of a manual gear box (transmission) of a vehicle, especially of a passenger car. The driver of the vehicle moves, as in conventional manual gear boxes, a gearshift lever with which a control lever 1 of the actuating device is accordingly displaced. The entire control lever 1 is represented in FIG. 4, while in FIGS. 1–3 only the engagement member 1' of the control lever 1 is shown at the free end of a radially projecting arm 2. When using the actuating device for a gear shifting mechanism with four gates, only two valves are required so that a constructively simple embodiment and especially a simple control of the two valves results.

Figure 1:
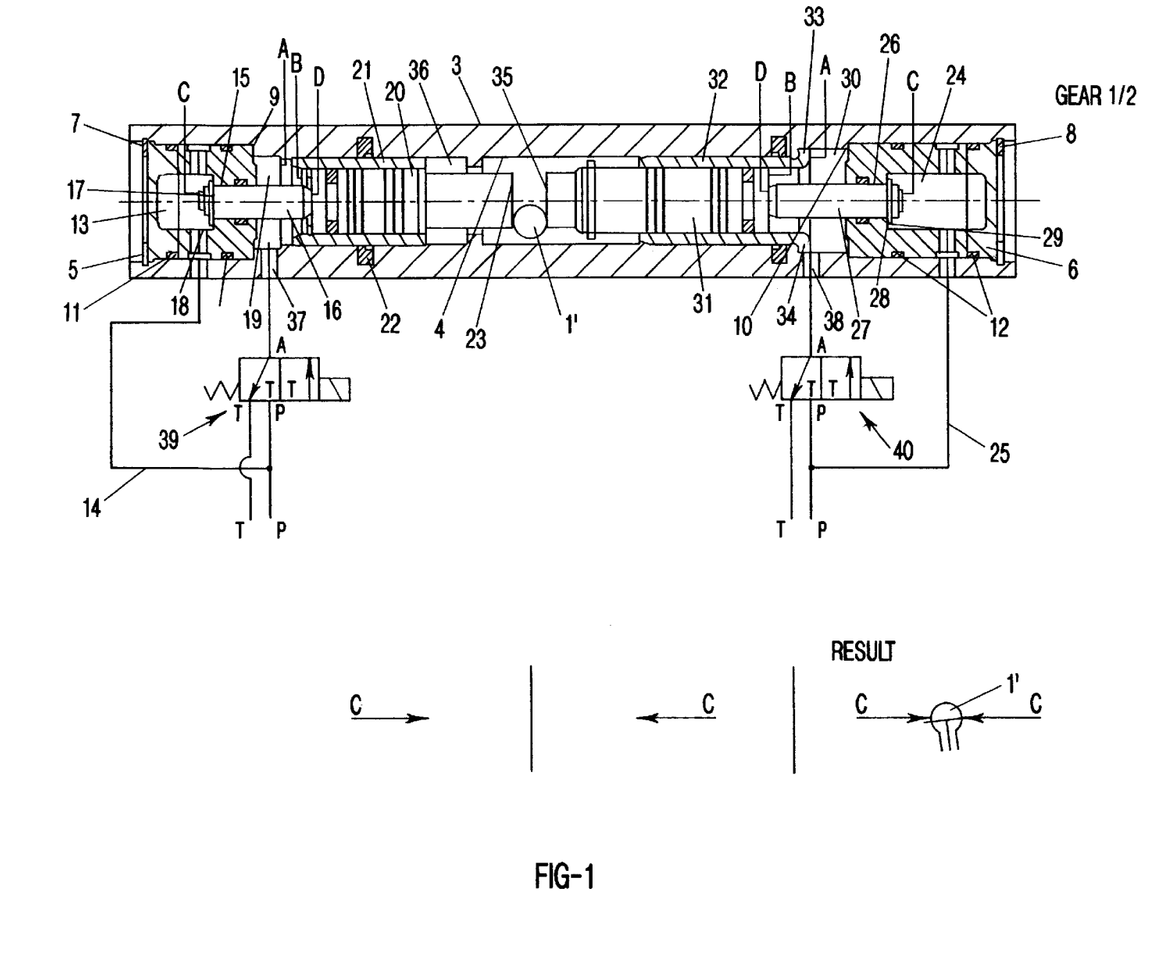
FIG. 1 is a sectional view of the inventive actuating device in a position in which the gate I of a gear shifting mechanism is selected.

The actuating device has a housing 3 with an axial opening or bore 4 which axially penetrates the housing 3 and is closed at both ends of the housing 3 by respective closure parts 5, 6. The two closure parts 5, 6 are inserted at the respective end face into the housing 3 and are secured in their position by a respective securing ring 7, 8. The closure parts 5, 6 are positioned with their inner ends at a radially inwardly projecting shoulder 9, 10 within the wall of the opening or bore. With respect to the wall of the bore, the closure parts 5, 6 are sealed by at least one gasket 11, 12, preferably two gaskets axially spaced relative to one another, whereby the gaskets are preferably annular seals.

The closure part 5 comprises a pressure chamber 13 which is connected by a line 14 to a pressure line P for a hydraulic medium. An axially positioned bore 15 opens into the pressure chamber 13 in which an auxiliary piston 16 is slidably supported in a sealed manner. The end projecting into the pressure chamber has an abutment 17 with which it is resting, in the position shown in FIG. 1, at the side wall 18 of the pressure chamber 13 facing the opposite closure part 6. The auxiliary piston 16 projects from the closure part 5 into a chamber 19 which is formed in part by the bore 4.

The auxiliary piston 16, in the position shown in FIG. 1, rests within the chamber 16 at the end face of the main piston 20 which is sealingly supported at the cylindrical piston or bushing 21. The main piston 20 together with the piston or bushing 21 is moveable within the bore 4. The piston 21 is sealed by at least one seal 22 relative to the wall of the bore 4.

The main piston 20 projects past the end face of the bushing 21 facing away from the auxiliary piston 16 and rests with its free end face 23 at the engagement member 1' of the control lever 1.

The closure part 6 also has a pressure chamber 24 which, via line 25, is connected to pressure line P for the hydraulic medium. In the pressure chamber 24 an axial bore 26 is provided in which the auxiliary piston 27 is supported in a slidable fashion and in a sealed manner. The end of the auxiliary piston 27 positioned within the pressure chamber 24 is provided with an abutment 28 with which the auxiliary piston 27, in the position represented in FIG. 1, rests at the side wall 29 of the pressure chamber 24 facing the oppositely arranged closure part 5.

The auxiliary piston 27 projects into the chamber 30 of the bore 4 and rests with its free end at the end face of the main piston 31 which is axially slidably supported in a bushing 32. The bushing 32 is a cylindercal piston which rests sealingly at the wall of the bore 4 and is axially slidable. The end of the bushing 32 facing the closure part 6 has a radially outwardly oriented annular flange 33 with which it rests at a radially inwardly extending annular shoulder 34 of the bore 4 in the position shown in FIG. 1. The main piston 31 rests with the end face 35 facing the closure part 5 also at the control lever engagement member 1'.

Since the two main pistons 20, 31 are supported in the cylindrical pistons or bushings 21, 32, the parts of the main piston 20, 31 projecting from the bushings 21, 32 have a spacing relative to the wall of bore 4. The free space or chamber 36 provided in this manner and extending in the area between the two cylindercal bushings 21, 32 is connected to the atmosphere. The housing 3 for this purpose is provided with at least one opening.

A connector 37 and 38 opens respectively into the chambers 19, 30.

FIG. 1 shows the position of the actuating device in which the gate I of the gear box of the vehicle has been selected. From this gate I, in a manner known per se, the first or second gear can be selected. For controlling the various pistons, two valves 39 and 40 are provided with which, in a manner to be described in the following, the pistons are supplied with hydraulic pressure. In the position represented in FIG. 1, in which the gate (path) I for the first and second gear of the gear box can be selected, the two valves 39, 40 are switched such that the two chambers 19 and 30 are connected by connectors 37, 38 to the reservoir or tank T. Via lines 14, 25, the hydraulic medium in the pressure chambers 13, 24 is thus pressurized.

The end faces of the auxiliary pistons 16, 27 positioned in the pressure chambers 13, 24 have the same surface area C. Via abutments 17, 28 the auxiliary pistons 16, 27 are supported at the side walls 18, 29 of the pressure chambers 13, 24. The bushing 32 rests with its annular flange 33 at the annular shoulder 34 of the housing 3 and is thus supported at the housing also. The auxiliary pistons 16, 27 rest with their end faces external to the pressure chambers 13, 24 at the main piston 20, 31 which themselves are resting at the engagement member 1'. The free space (chamber) 36 is at atmospheric pressure, while the chambers 19, 30 are filled with hydraulic medium that, since it is connected to the reservoir (tank) T, is under atmospheric pressure.

The two auxiliary pistons 16, 27 are supported at the housing by their abutments 17, 28. The bushing 32 is also supported at the housing by its ring flange 33. The oppositely positioned auxiliary piston 16 is pressurized by the hydraulic pressure within the pressure chamber 13 and is secured by its abutment 17 at the side wall 18 of the pressure chamber 13. Since the main pistons 20 rests at the auxiliary piston 16, the engagement part 1' is provided with the required counter force which opposes the force acting onto the other side. Since the two end faces of the auxiliary piston 16, 27 positioned within the pressure chambers 13, 24 have the same surface area C, the control lever 1 is maintained in the position for selecting the gate I. The two oppositely oriented forces acting on the engagement member 1', which are the result of the pressure loading of the end faces of the auxiliary pistons having the surface area C, are identical. This is illustrated by the arrows C having the same size.

Figure 2:
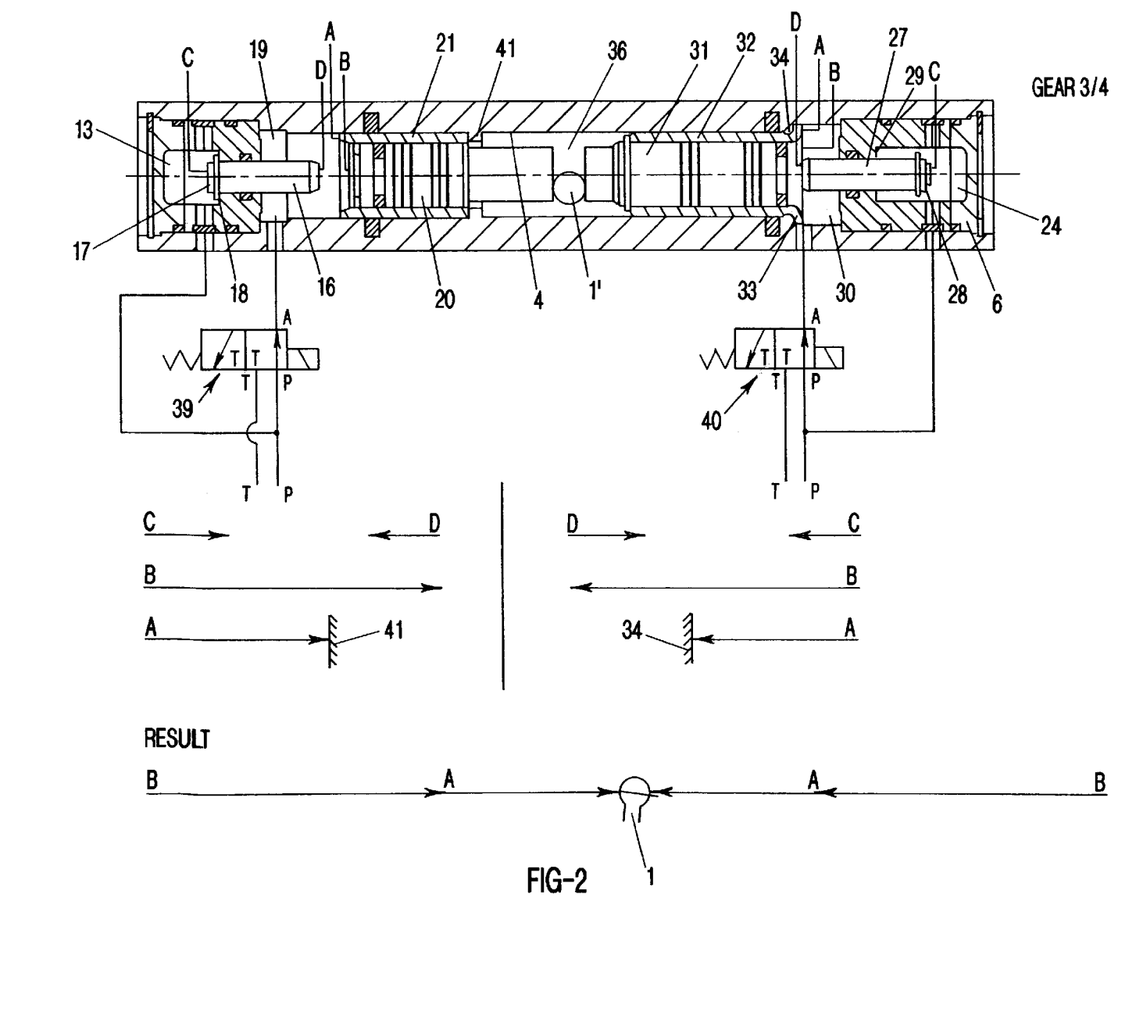
FIG. 2 shows in a representation corresponding to FIG. 1 the inventive actuating device in a position in which the gate II of the gear shifting mechanism is selected.

FIG. 2 shows the position of the different pistons when the control level 1 has been moved such that the gate II for the third and fourth gear has been selected. In this case, the control lever 1, respectively, its engagement part 1' is pivoted in the clockwise direction relative to the representation in the drawing. This displacement of the control lever results in movement of the main piston 31 to the right relative to the position shown in FIG. 1. The auxiliary piston 27 is thus moved in the same direction. Its abutment 28 is lifted off the side wall 29 of the pressure chamber 30. The two valves 39, 40 are switched such that the hydraulic medium within the chambers 19, 30 can be pressurized. The hydraulic medium in the pressure chambers 13, 24 is still maintained under pressure. The auxiliary piston 16 remains in its position because it rests with its abutment 17 at the side wall 18 of the pressure chamber 13. Since the hydraulic medium in the chamber 19 is pressurized, the main piston 20 and the piston (bushing) 21 seated thereon are loaded with pressure so that they are moved to the left in FIG. 2. In the position of the control lever 1 for the gate II, the piston 21 is positioned at a radially inwardly oriented collar 41 in the wall of the bore 4. The main piston 20 projects with radial play through the collar 41. The oppositely positioned bushing 32 rests with its annular flange 33 at the annular shoulder 34 because the hydraulic medium in the chamber 30 is pressurized.

The resulting forces of this position are schematically shown in FIG. 2. Since the two end faces of the auxiliary piston 16 have the same surface area C and D and the two end faces are loaded by hydraulic pressure, the forces acting in opposite direction thereon are identical. The end face B of the main piston 20 is also subjected to hydraulic pressure. Since the chamber 36, which is not filled with hydraulic medium, is connected to the atmosphere, the main piston 20 is subjected only to the force acting on the end face B which, since the surface area B is substantially greater than the surface area C of the smaller end face of the auxiliary piston 16, is substantially greater than the force acting on the end face C in the same direction.

Since the second auxiliary piston 27 also has end faces C and D of the same size, which are loaded with the same pressure, the same forces of the same size are acting on the auxiliary piston 27, indicated by arrows C and D. The end face of the main piston 31 facing the closure part 6 has the surface area B which is identical to that of the corresponding end face of the oppositely arranged main piston 20. The forces acting onto the end faces with a surface area B of the main piston 20, 31 are of the same size and opposite to one another.

The end faces A of the bushings 21, 32 are also supplied with pressure by the hydraulic medium contained within the chambers 19, 30. The bushing 21 is supported at the collar 41, and the bushing 32 is supported by its annular flange 33 at the annular shoulder 34 of the housing 3. The resulting forces are again opposite and of the same size because of the same surface area A.

Thus, the forces A, B acting on opposite sides of the control lever 1 are opposite to one another and of the same size. The control lever 1 is thus maintained in the position correlated with the gate II. For pivoting the control lever 1 from the position of FIG. 1 into the position of FIG. 2, the force acting on the surface C of the auxiliary piston 27 positioned within the pressure chamber 24 must be overcome. When the control lever 1 in this position is released, the force acting onto the auxiliary piston 27 would return the control lever 1 into the initial position of FIG. 1.

Figure 3:
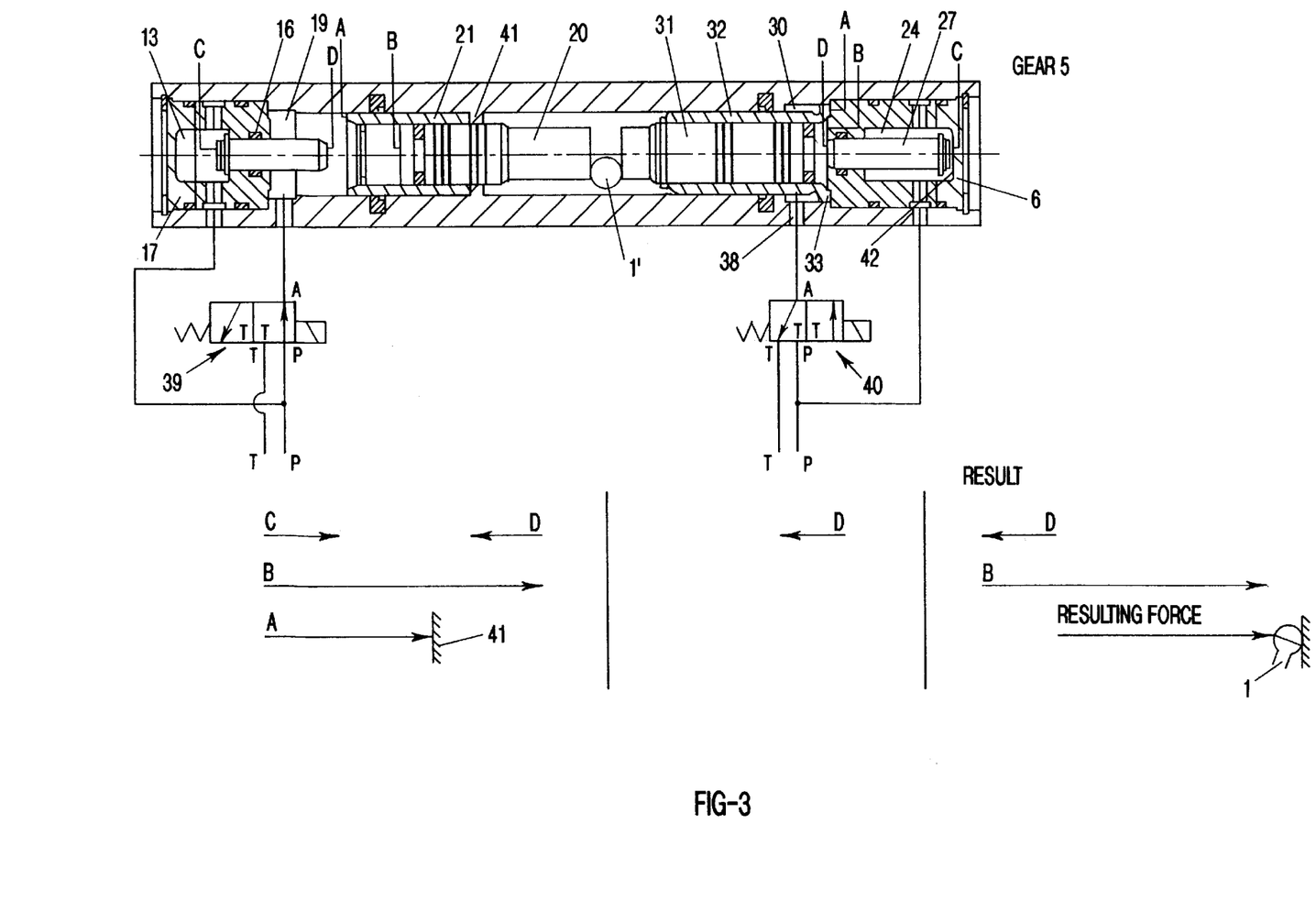
FIG. 3 is a representation corresponding to FIG. 1 of the inventive actuating device in a position in which the gate III of the gear shifting mechanism is selected.
Figure 4:
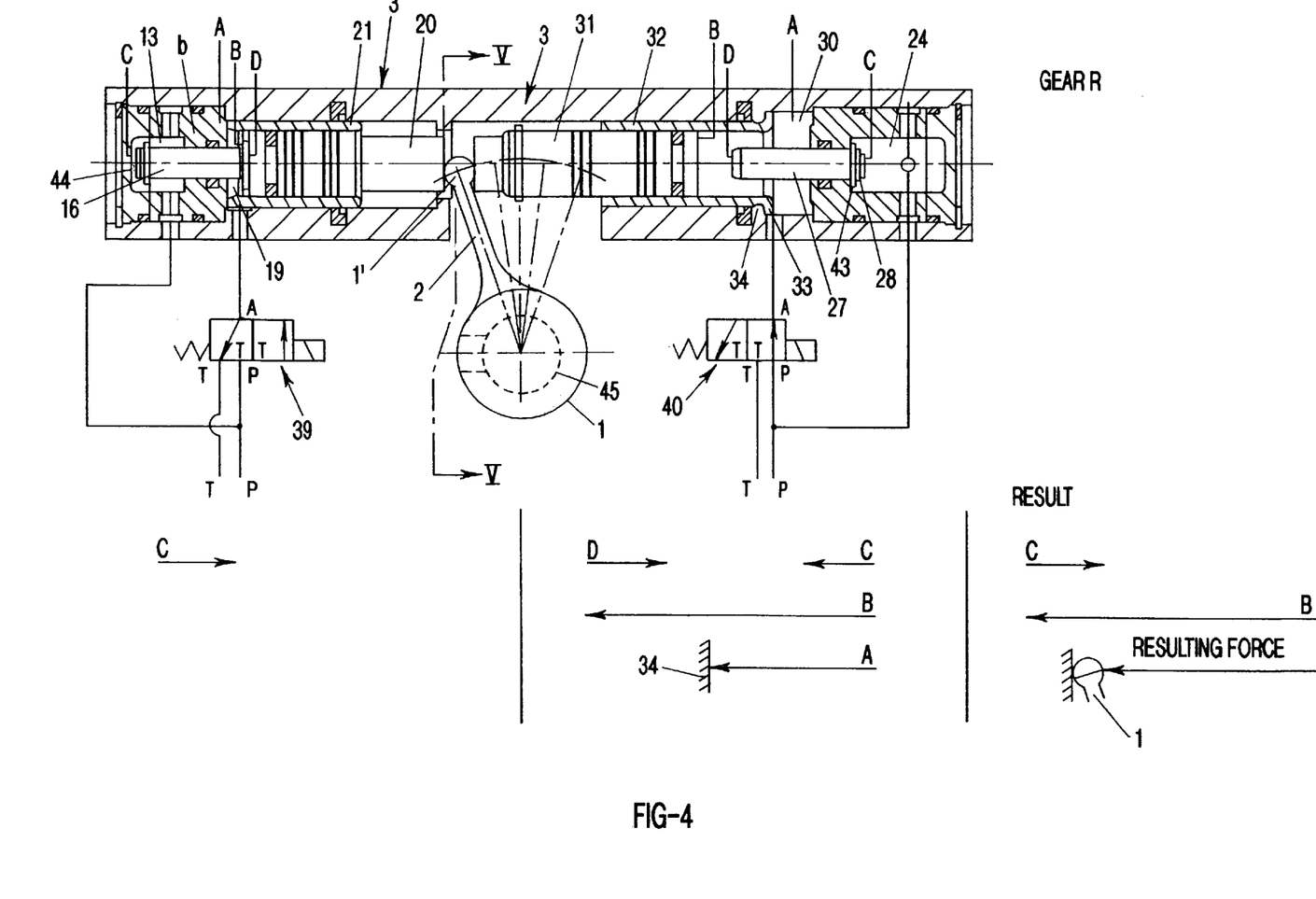
FIG. 4 corresponds to a representation according to FIG. 1 showing the inventive actuating device in a position in which the gate for the reverse gear has been selected within the gear shifting mechanism.

The control lever 1 can be further pivoted in the clockwise direction into the position represented in FIG. 3. This corresponds to selecting the gate III from which the fifth and optionally the sixth gear can be selected. The valve 39 remains in its switching position according to FIG. 2 so that the hydraulic medium in the pressure chamber 13 as well as in the pressure chamber 19 is pressurized. The auxiliary piston 16 remains in its abutment position. The bushing 21 remains in abutment at the collar 41. The valve 40 is switched such that the connector 38 is connected to the tank T. The hydraulic medium in the pressure chamber 24 is further pressurized. The main piston 20 is moved farther to the right because of the hydraulic pressure acting on its left end face. Since this pressure-loaded end face of the main piston 20 has a greater surface area than the end face of the auxiliary piston 27 which is loaded by the hydraulic medium within the pressure chamber 24, the main piston 31, the cylindercal bushing 32 seated thereon, and the auxiliary piston 27 are moved by the engagement member 1' to the left until the hydraulic piston 27 abuts the side wall 42 of pressure chamber 24. Since the pressure chamber 30 is pressure-relieved to the tank T and the hydraulic medium in this chamber is thus under atmospheric pressure, the bushing 32 is moved to the right until it comes to rest at the annular flange 33 at the closure part 6. The auxiliary piston 27 rests at the main piston 31 which, together with the oppositely arranged main piston 20, moves the control lever 1 into the position corresponding to the gate III.

In FIG. 3 the respective force relationships are shown. The two end faces of auxiliary piston 16 with the same surface area C, D are loaded by hydraulic medium. The auxiliary piston 16 thus remains with its abutment 17 in the shown abutment position at the closure part 5. Thus, the auxiliary piston 16 is loaded by opposite identical forces which are represented by arrows C and D. The hydraulic medium in the pressurized chamber 19 acts on the corresponding end face of the main piston. The resulting force is shown with arrow B in the diagram of forces. Furthermore, this hydraulic pressure also acts on the end face A of the cylindercal bushing 21 which rests under this hydraulic pressure at the collar 41. The resulting forces is indicated in the force diagram with arrow A.

Onto the opposite side of the engagement member 1' only the force indicated by arrow D acts which results from the hydraulic medium acting at atmospheric pressure on end face D of the auxiliary piston 27. Since the opposite forces acting on the auxiliary piston 16 compensate one another and the hydraulic force acting on the cylindercal bushing 21 is received at the housing, the control lever 1 is acted on from the left only by the force acting on the main piston 20 which is indicated by arrow B. At the opposite side of the control lever 1 only the force indicated by arrow D acts opposite to the force B. Thus, onto the control lever 1 a resulting force acts which forces the control lever to the right, as schematically shown in FIG. 3. Thus, the control lever 1 is maintained reliably in this position.

FIG. 4 shows the scenario that the control lever 1, starting from the position according to FIG. 1, is pivoted counter clockwise to the gate IIII in which the reverse gear R can be selected. The two valves 39, 40 are switched such that via the valve 39 the hydraulic medium contained within the chamber 19 can be relieved to the tank T, while the hydraulic medium in the pressure chamber 13 is pressurized. Via the valve 40 the hydraulic medium is thus pressurized in the pressure chamber 24 as well as in the pressure chamber 30.

The auxiliary piston 27 is moved to the left by the hydraulic medium pressurized within the pressure chamber 24 until the abutment 28 comes to rest at the side wall 43 of the pressure chamber 24 which is facing the main piston 31. Due to the pressurized hydraulic medium within the pressure chamber 30, the main piston 31 is moved to the left whereby the hydraulic medium acts on the end face of the main piston 31 having the surface area B. The cylindrical bushing 32 is also moved to the left because its annular flange 33 is also loaded by the hydraulic medium pressurized within the chamber 30. The piston 32 is displaced to such an extent until the annular flange 33 abuts the annular shoulder of the housing 3.

Since the hydraulic medium in the pressure chamber 19 communicates with the tank T, the main piston 20 can be moved to the left. It entrains the auxiliary piston 16 counter to the pressure within the pressure chamber 13 until the auxiliary piston 16 rests at the side wall 44 of the pressure chamber 13. The piston 21 which is seated on the main piston 20 thus abuts the closure part 5.

Only the force indicated by arrow C is acting from the left onto the control lever 1. This force C results from the support of auxiliary piston 16 with its end face having the surface area C at he housing.

The oppositely oriented forces resulting from the hydraulic pressure within the chambers 24 and 33 act on the auxiliary piston 27.

Since the two end faces of the auxiliary piston 27 have the same surface areas C, D, the oppositely acting forces compensate one another. A further force acting from the right onto the control level 1 results from the pressure loading of the main piston 31 at the end face having the surface area B. The resulting force acting on the engagement member 1' is indicated in the force diagram of FIG. 4 by arrow B.

Via the surface area A the hydraulic medium in the pressure chamber 30 also acts on the cylindercal bushing 32 which force is shown in the force diagram of FIG. 4 by arrow A. This force A is received by the annular shoulder 34 so that it does not act on the control lever 1. Thus, the result is that onto the control lever 1 the force indicated by arrow C acts from the left and the substantially greater force indicated by arrow B acts from the right. Thus, the control lever is subjected to a resulting force which acts from the right and which will secure the control lever in the pivoted position safely.

The two valves 39, 40 may have a common pump with correspondingly dimensioned pumping volume. This pump is turned on upon actuation of the gearshift in the vehicle so that via corresponding movement of the piston the control lever 1 can be displaced or moved in the aforedescribed manner into the desired direction.

The pump, however, can also be switched so as to provide pressure-free circulation by a non-represented valve. In this case, the hydraulic medium, as long as a gearshifting process does not occur, is only recirculated and not pressurized. However, as soon as the gearshifting process is initiated and the gearshift of the vehicle is moved accordingly, this valve is brought into the corresponding switching position. Then, the P connectors of the respective valves 39, 40 are supplied with pressure.

It is also possible to provide each valve 39 and 40 with a respective pump of small conveying volume that are combined with a reservoir. Between the disclosed actuating device and this reservoir a non-represented shut-off device is provided in order to avoid leakage of oil within the reservoir.

Figure 5:
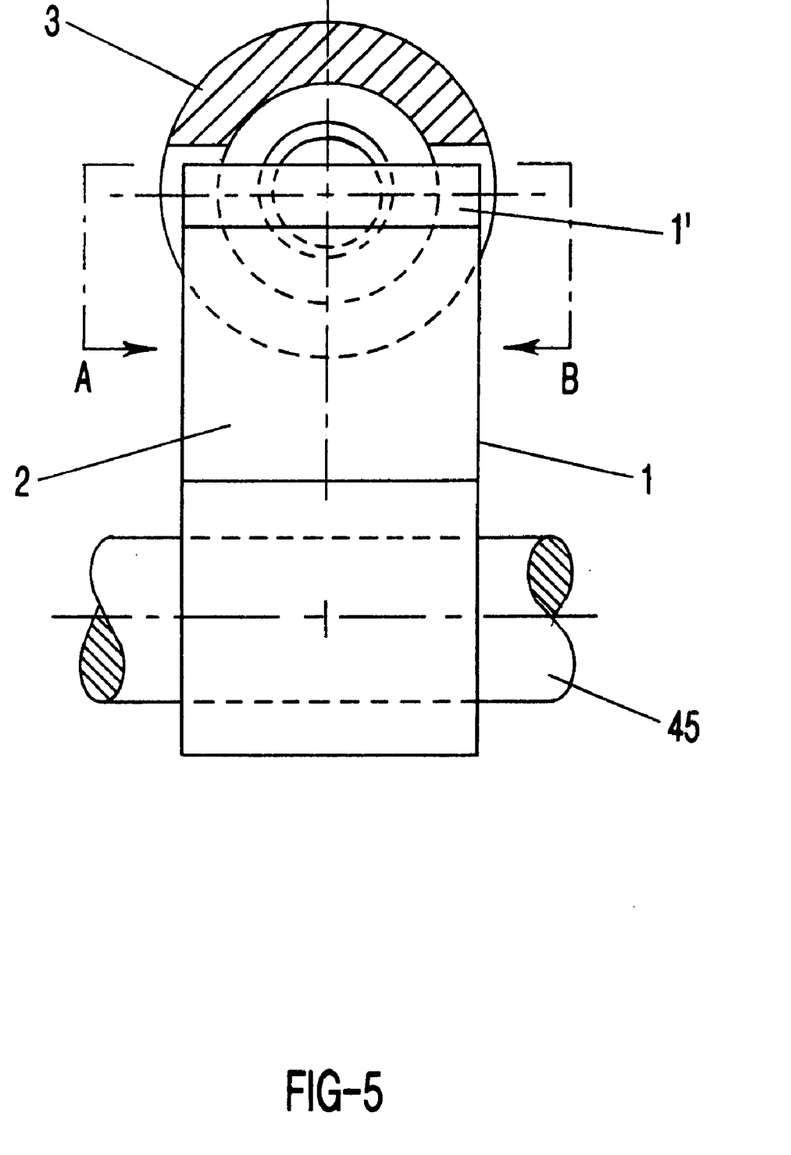
FIG. 5 shows a section along the line V—V of FIG. 4.

The control lever 1 is positioned, as can be seen in FIGS. 4 and 5, on a gearswitching shaft (actuator shaft) 45 of the gear box of the vehicle. When the control lever 1 is pivoted in the aforedescribed manner into the different positions and the respective gate is selected, the gearswitching shaft 45 is rotated by a corresponding amount about its axis. In order to select the respective gear within the selected gate, the gearswitching shaft 45 is axially displaced in the desired direction. In FIG. 5 the two outermost positions of the engagement member 1' is represented when the control lever 1 is moved by the gearswitching shaft 45 from its neutral position, shown in solid lines in the drawing, to the left or right for selecting the respective gear in the selected gate. The substantially cylindrically embodied engagement member 1' is of such a length in the axial direction of the gearswitching shaft 45 that it is always positioned between the main piston 20, 31. When the control lever is moved to the left to the position A in FIG. 5, the even gears (2, 4, 6) are selected. When the control lever 1 in FIG. 5 is moved to the right into the position B, the odd gears (1, 3, 5) are selected.

The present invention is, of course, in no way restricted to the specific disclosure of the specification and drawings, but also encompasses any modifications within the scope of the appended claims.

What is claimed is:

1. An actuating device for automation of a manual transmission of a vehicle having a plurality of gates, said actuating device comprising:

a housing having a chamber under atmospheric pressure;

first and second bushings slidably supported in said housing;

a first main piston supported in said first bushing and a second main piston supported in said second bushing wherein said first main piston has a first end face loaded by a hydraulic medium and a second end face remote from said first end face, and wherein said second main piston has a first end face loaded by the hydraulic medium and a second end face remote from said first end face, said second end faces of said first and second main pistons positioned in said chamber under atmospheric pressure and facing one another;

a control lever, fixedly connected to an actuator shaft of the manual transmission, for selecting one of said gates of the manual transmission, said control lever positioned between said first and second main pistons;

a first valve hydraulically controlling and actuating said first main piston by a hydraulic medium;

a second valve hydraulically controlling and actuating said second main piston by the hydraulic medium;

a first auxiliary piston cooperating with said first main piston and having end faces loaded by the hydraulic medium;

a second auxiliary piston cooperating with said second main piston and having end faces loaded by the hydraulic medium, wherein a surface area of each one of said end faces of said first auxiliary piston is smaller than a surface area of said first end face of said first main piston and wherein a surface area of each one of said end faces of said second auxiliary piston is smaller than a surface area of said first end face of said second main piston, wherein a first pressure chamber has a sidewall facing said first main piston and a second pressure chamber has a sidewall facing said second main piston, wherein said first auxiliary piston has a first abutment and said second auxiliary piston has a second abutment, said first abutment resting under hydraulic pressure at said sidewall of said first pressure chamber in at least one position of said control lever, and said second abutment resting under hydraulic pressure at said sidewall of said second pressure chamber in at least one position of said control lever.

2. An actuating device according to claim 1, wherein said first and second bushings have at least one position in which said first and second bushings are supported at said housing against the hydraulic pressure.

3. An actuating device according to claim 1, wherein said first bushing has an end face facing away from said second bushing and said second bushing has an end face facing away from said first bushing, wherein said end face of said first bushing and said end face of said second bushing are loaded by the hydraulic medium.

4. An actuating device according to claim 1, wherein:
said end face of said first auxiliary piston facing away from said first main piston is positioned in said first pressure chamber; and
said end face of said second auxiliary piston facing away from said second main piston is positioned in said second pressure chamber.

5. An actuating device according to claim 4, wherein said first pressure chamber is connected to a first pressure line and wherein said second pressure chamber is connected to a second pressure line, said first and second pressure lines adapted to transport hydraulic medium to said pressure chambers.

6. An actuating device according to claim 4, wherein:
said housing has a third and a fourth pressure chambers;
said first end face of said first main piston is positioned in said third pressure chamber;
said first end face of said second main piston is positioned in said fourth pressure chamber;
said first valve communicates with said third pressure chamber; and
said second valve communicates with said fourth pressure chamber.

7. An actuating device according to claim 1, wherein said end faces of said first auxiliary piston have identical surface areas and said end faces of said second auxiliary piston have identical surface areas.

8. An actuating device according to claim 1, wherein said first bushing has an end face facing said second bushing and said second bushing has an end face facing said first bushing, wherein said end face of said first bushing and said end face of said second bushing are loaded by atmospheric pressure.

9. An actuating device according to claim 1, wherein said second end faces of said first and second main pistons have a surface area that is smaller than said surface area of said first end faces of said first and second main pistons.

* * * * *